US010552990B2

(12) United States Patent
Lee et al.

(10) Patent No.: US 10,552,990 B2
(45) Date of Patent: Feb. 4, 2020

(54) ELECTRONIC APPARATUS AND CONTROL METHOD THEREOF

(71) Applicant: SAMSUNG ELECTRONICS CO., LTD., Suwon-si (KR)

(72) Inventors: Sang-young Lee, Anyang-si (KR); Hee-seok Jeong, Suwon-si (KR); Kyu-hyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 15/725,907

(22) Filed: Oct. 5, 2017

(65) Prior Publication Data
US 2018/0114342 A1 Apr. 26, 2018

(30) Foreign Application Priority Data

Oct. 25, 2016 (KR) .......................... 10-2016-0139367

(51) Int. Cl.
G06T 11/00 (2006.01)
G06T 7/215 (2017.01)
(52) U.S. Cl.
CPC .............. G06T 11/00 (2013.01); G06T 7/215 (2017.01)
(58) Field of Classification Search
CPC ....... G06T 11/00; G06T 7/215; G06F 3/1454; H04N 5/23238; G09G 2370/022; G09G 2360/121; G09G 2354/00; G09G 5/393
See application file for complete search history.

(56) References Cited

U.S. PATENT DOCUMENTS 6,167,567 A * 12/2000 Chiles ..................... G06F 9/454
717/173
2011/0263332 A1* 10/2011 Mizrachi ................ A63F 13/12
463/42

(Continued)

FOREIGN PATENT DOCUMENTS

EP          1 117 256 A1    7/2001
EP          1 190 575 B1    8/2009
KR    10-2013-0099497 A    9/2013

OTHER PUBLICATIONS

International Search Report and Written Opinion dated Jan. 25, 2018 by the International Searching Authority in counterpart International Patent Application No. PCT/KR2017/010868). (PCT/ISA/210 & PCT/ISA/237).

(Continued)

Primary Examiner — William A Beutel
(74) Attorney, Agent, or Firm — Sughrue Mion, PLLC

(57) ABSTRACT

An electronic apparatus is provided. The electronic apparatus includes an image receiver configured to receive an input image corresponding to an azimuthal range where a viewpoint is movable; a communicator configured to communicate with a first display apparatus; and at least one processor configured to control the communicator to receive information of a first viewpoint from the first display apparatus, and control the communicator to transmit an image comprising a first area and a second area within the input image to the first display apparatus, the first area corresponding to the first viewpoint and being displayed on a screen of the first display apparatus, the second area being adjacent to the first area and including one or more widths corresponding to a moving characteristic of the first viewpoint.

17 Claims, 13 Drawing Sheets

(56) References Cited

U.S. PATENT DOCUMENTS

| | | | |
|---|---|---|---|
| 2011/0316963 A1 | 12/2011 | Li et al. | |
| 2012/0249741 A1* | 10/2012 | Maciocci | G06F 3/011 |
| | | | 348/46 |
| 2014/0267429 A1* | 9/2014 | Justice | G06T 3/60 |
| | | | 345/649 |
| 2015/0026739 A1 | 1/2015 | Kitazato | |
| 2015/0058102 A1 | 2/2015 | Christensen et al. | |
| 2015/0234184 A1 | 8/2015 | Schowengerdt et al. | |
| 2015/0235430 A1* | 8/2015 | Schowengerdt | G06F 3/012 |
| | | | 345/633 |
| 2016/0012855 A1 | 1/2016 | Krishnan | |
| 2016/0180495 A1* | 6/2016 | Thulasimani | G02B 27/017 |
| | | | 345/545 |
| 2016/0260196 A1 | 9/2016 | Roimela et al. | |
| 2017/0098330 A1* | 4/2017 | Inomata | G06F 3/012 |
| 2017/0111636 A1* | 4/2017 | Hasegawa | G02B 7/12 |

OTHER PUBLICATIONS

Communication dated Mar. 19, 2018 by the European Patent Office in counterpart European Patent Application No. 17196236.8.

* cited by examiner

FIG. 4
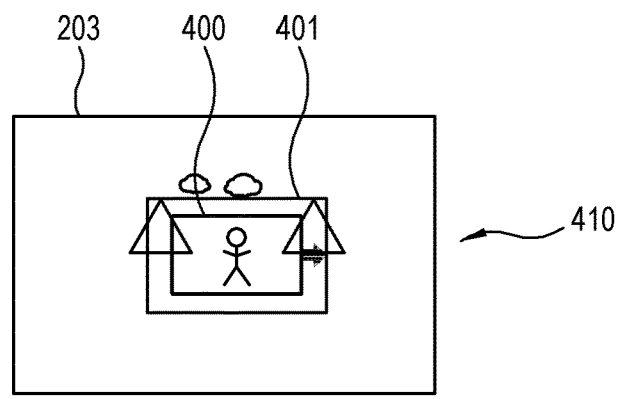
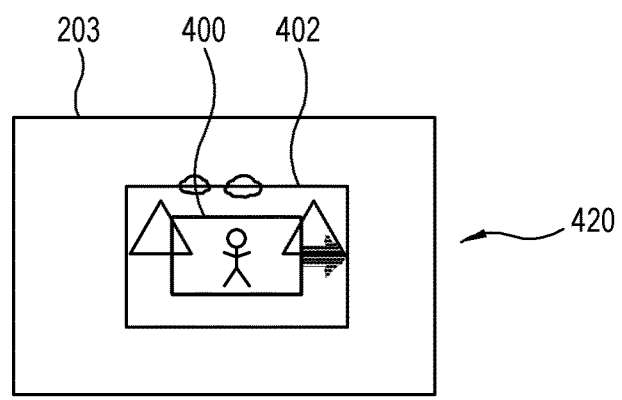
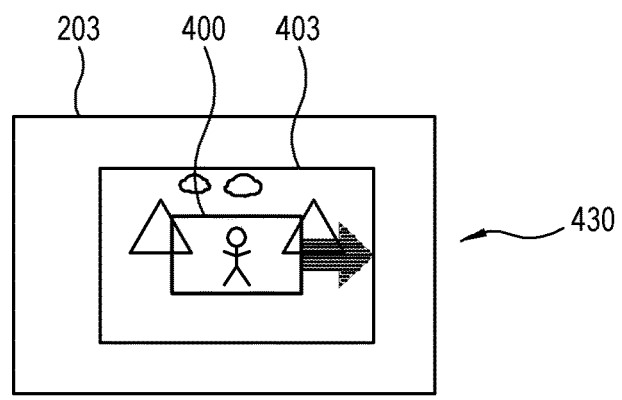

FIG. 5
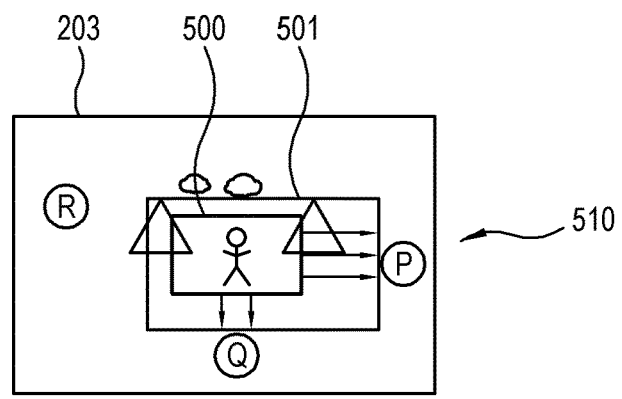
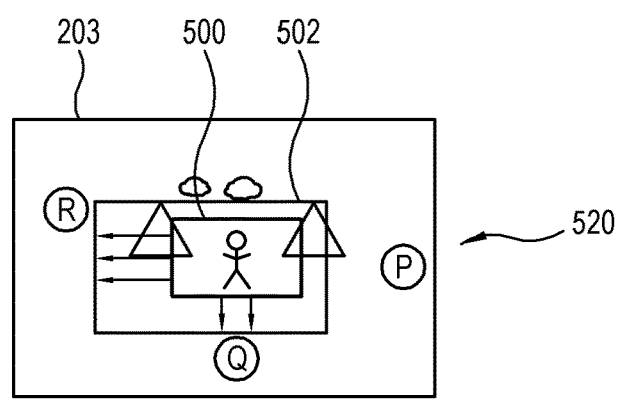
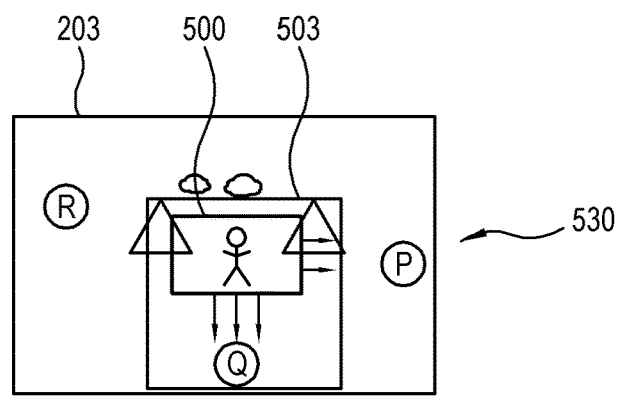

FIG. 6

| USERS | AVERAGE MOVING SPEED OF VIEWPOINT | MOVING FREQUENCY TO SPECIFIC AREA | AVERAGE STATIC TIME IN SPECIFIC AREA | CONTENT TYPE PREFERENCE |
|---|---|---|---|---|
| A | 10°/ms | AREA P:3/s<br>AREA Q:2/s<br>AREA R:1/s | AREA P:300ms<br>AREA Q:450ms<br>AREA R:700ms | NATURE, SCENERY |
| B | 20°/ms | AREA P:2/s<br>AREA Q:4/s<br>AREA R:7/s | AREA P:350ms<br>AREA Q:110ms<br>AREA R:50ms | ANIMAL |
| C | 30°/ms | AREA P:3/s<br>AREA Q:7/s<br>AREA R:1/s | AREA P:170ms<br>AREA Q:70ms<br>AREA R:50ms | CAR, AIRPLANE |

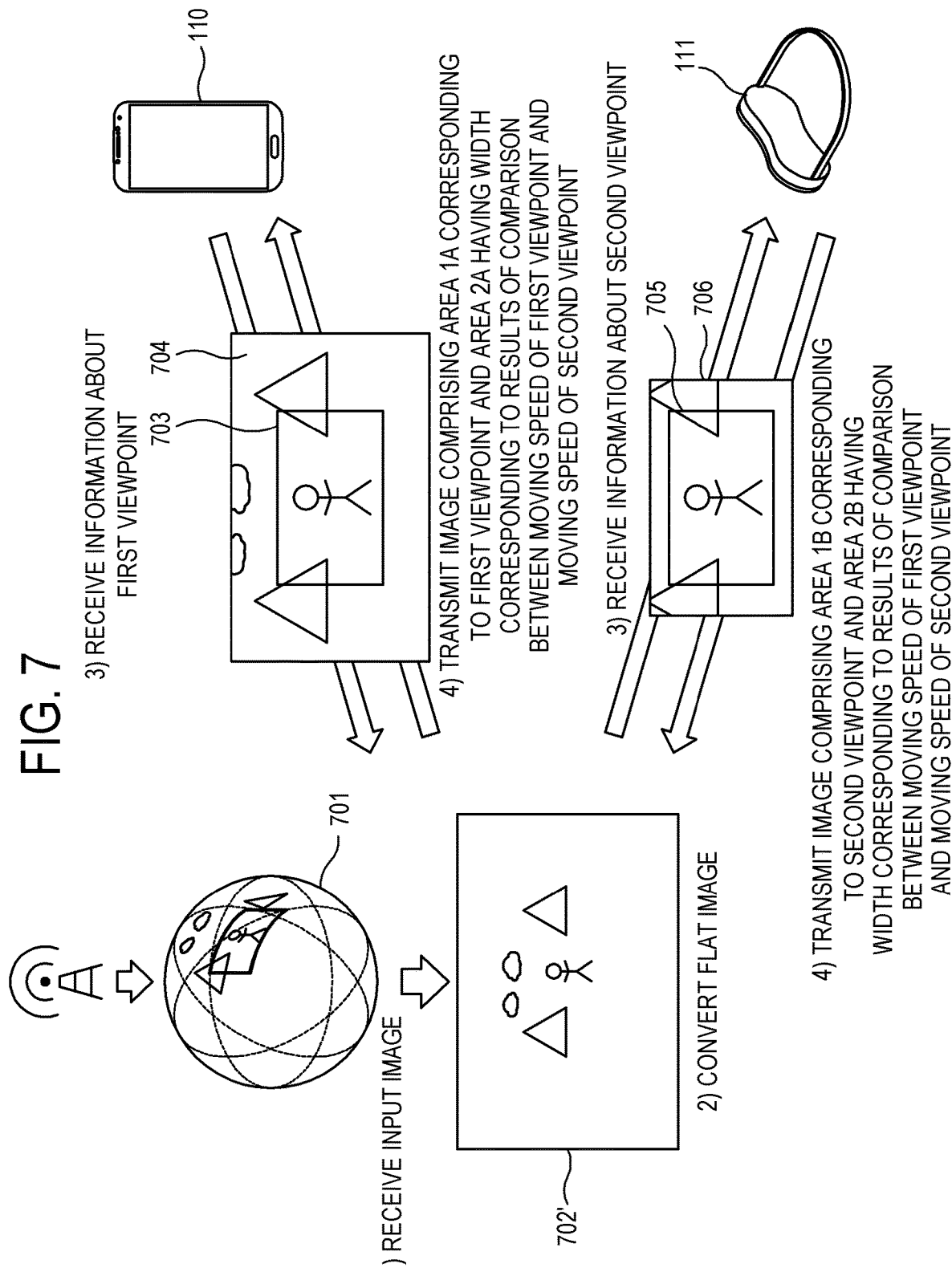

ELECTRONIC APPARATUS AND CONTROL METHOD THEREOF

CROSS-REFERENCE TO RELATED THE APPLICATION

The application claims priority from Korean Patent Application No. 10-2016-0139367, filed on Oct. 25, 2016 in the Korean Intellectual Property Office, the disclosure of which is incorporated herein by reference.

BACKGROUND

Field

Apparatuses and methods consistent with exemplary embodiments relate to an electronic apparatus and a control method thereof, and more particularly to an electronic apparatus that transmits an image corresponding to a specific viewpoint to a display apparatus and a control method thereof.

Description of the Related Art

Display apparatuses recently being developed are capable of providing a variety of images including, for example, a 360 degree/virtual reality (VR) image. The 360 degree/VR image or similar image corresponding to an azimuthal range may be taken by a plurality of cameras or a camera having a plurality of lenses, and may allow a user to view the image while moving his/her viewpoint when it is displayed mapped to a virtual space. Therefore, a user may feel as if s/he is in a real space.

Such an image corresponding to an azimuthal range may have larger amount of data, and therefore it may take longer to process the image. In particular, the 360 degree/VR image may have a significantly large amount of data since it corresponds to a full screen of 360°×180° in vertical and horizontal directions. However, an image that may be viewed by a user at a certain viewpoint may be only a portion of the 360 degree/VR image displayed on the display apparatus since the user has a limited field of view. Therefore, it may be inefficient for a display apparatus to receive and process a full image.

Such inefficiency may be magnified in an N-screen service where the 360 degree/VR image is separately displayed on a plurality of display apparatuses because a bandwidth that may not be viewed by a user may be doubled by the number of separate display apparatuses.

Accordingly, there is a need for an electronic apparatus that may more efficiently transmit an image to a display apparatus to enable the display apparatus to reproduce an image without or with reduced discontinuity irrespective of a user's viewpoint changing.

SUMMARY

One or more exemplary embodiments provide an electronic apparatus which may transmit an image generated corresponding to an azimuthal range to a display apparatus configured to display the image.

One or more exemplary embodiments also provide an electronic apparatus which may improve an efficiency of transmitting an image and may transmit an image to a display apparatus to enable the image to be displayed without or with reduced discontinuity when a user of the display apparatus moves a viewpoint.

According to an aspect of an example embodiment, there is provided an electronic apparatus including: an image receiver configured to receive an input image corresponding to an azimuthal range where a viewpoint is movable; a communicator configured to communicate with a first display apparatus; and at least one processor configured to control the communicator to receive information of a first viewpoint from the first display apparatus, and control the communicator to transmit an image including a first area and a second area within the input image to the first display apparatus, the first area corresponding to the first viewpoint and being displayed on a screen of the first display apparatus, and the second area being adjacent to the first area and including one or more widths corresponding to a moving characteristic of the first viewpoint.

The processor may be further configured to control the communicator to receive information of a screen size of the first display apparatus from the first display apparatus, and the first area may correspond to the screen size of the first display apparatus.

The moving characteristic of the first viewpoint may include a moving speed of the first viewpoint and a moving frequency of the first viewpoint with respect to a certain area within the input image.

The processor may be further configured to increase the one or more widths of the second area corresponding to at least one of the moving speed of the first viewpoint and the moving frequency of the first viewpoint increasing.

The processor may be further configured to determine the moving characteristic of the first viewpoint based on a viewpoint history of a user of the first display apparatus.

The viewpoint history of the user may include at least one of an average moving speed of the first viewpoint, a moving frequency of the first viewpoint, and one or more contents in the input image.

The processor may be further configured to determine the one or more widths of the second area based on one or more contents of the input image.

The processor may be further configured to: control the communicator to receive information of a second viewpoint from a second display apparatus configured to display an image corresponding to the second viewpoint within the input image, and transmit the information of the second viewpoint to the first display apparatus.

The processor may be further configured to determine the moving characteristic of the first viewpoint based on the second viewpoint.

The processor may be further configured to determine the one or more widths of the second area based on network conditions between the electronic apparatus and the first display apparatus.

The processor may be further configured to: control the communicator to receive information of a second viewpoint from a second display apparatus configured to display an image corresponding to the second viewpoint within the input image, and determine the one or more widths of the second area based on comparison between a moving speed of the first viewpoint and a moving speed of the second viewpoint.

The processor may be further configured to determine the one or more widths of the second area within a range of a communication bandwidth between the electronic apparatus and the first and second display apparatuses.

The processor may be further configured to: control the communicator to receive information of a third viewpoint from the first display apparatus after a predetermined time, and transmit an image including a third area and a fourth area within the input image to the first display apparatus, the third area corresponding to the third viewpoint and being displayed on a screen of the first display apparatus, the fourth area being adjacent to the third area including one or more widths corresponding to a moving characteristic of the third viewpoint.

The processor may be further configured to determine the one or more widths of the second area based on at least one of a moving speed of the third viewpoint, a moving frequency of the third viewpoint, a viewpoint history of a user of the first display apparatus.

According to an aspect of another example embodiment, there is provided a control method of an electronic apparatus, the control method including: receiving an input image corresponding to an azimuthal range where a viewpoint is movable; receiving information of a first viewpoint from the first display apparatus; and transmitting an image including a first area and a second area within the input image to the first display apparatus, the first area corresponding to the first viewpoint and being displayed on a screen of the first display apparatus, the second area being adjacent to the first area and including one or more widths corresponding to a moving characteristic of the first viewpoint.

The control method may further include receiving information of a screen size of the first display apparatus from the first display apparatus, wherein the first area corresponds to the screen size of the first display apparatus.

The control method, wherein the moving characteristic of the first viewpoint may include a moving speed of the first viewpoint and a moving frequency of the first viewpoint with respect to a certain area within the input image.

The control method may further include determining the moving characteristic of the first viewpoint based on a viewpoint history of a user of the first display apparatus, wherein the viewpoint history of the user comprises at least one of an average moving speed of the first viewpoint, a moving frequency of the first viewpoint, and one or more contents in the input image.

The control method may further include determining the one or more widths of the second area based on one or more contents of the input image.

The control method may further include receiving information of a second viewpoint from a second display apparatus configured to display an image corresponding to the second viewpoint within the input image, and transmitting the information of the second viewpoint to the first display apparatus.

The control method may further include determining the moving characteristic of the first viewpoint based on the second viewpoint.

The control method may further include determining the one or more widths of the second area based on network conditions between the electronic apparatus and the first display apparatus.

A computer program product including a computer readable medium including a computer program stored thereon, which, when executed by a computing device, causes the computing device to execute the control method.

The computer readable program may be stored in the computer readable storage medium in a server, and wherein the computer program is downloaded over a network to the computing device.

BRIEF DESCRIPTION OF THE DRAWINGS

The above and/or aspects will become apparent and more readily appreciated from the following description of exemplary embodiments, taken in conjunction with the accompanying drawings, in which:

FIG. 4 illustrates a relationship between a moving speed of a viewpoint and the second area according to an exemplary embodiment;

FIG. 5 illustrates a relationship between a moving frequency of a viewpoint and the second area according to an exemplary embodiment;

FIG. 6 shows an example of a user viewpoint history according to an exemplary embodiment;

FIG. 7 illustrates a plurality of display apparatuses with respect to the electronic apparatus according to an exemplary embodiment;

DETAILED DESCRIPTION OF EXEMPLARY EMBODIMENTS

Exemplary embodiments will be described in detail with reference to accompanying drawings. In the following descriptions referring to the accompanying drawings, like numerals refer to like elements having substantially the same function.

The terms used are merely used to describe exemplary embodiments, and are not intended to limit the present disclosure. As used herein, the singular forms "a," "an" and "the" are intended to include the plural forms as well, unless the context clearly indicates otherwise. Also, it is to be understood that the terms such as "include," "have," etc., are intended to indicate the existence of the features, numbers, operations, components, parts, or combinations thereof disclosed in the disclosure, and are not intended to preclude the possibility that one or more other features, numbers, operations, components, parts, or combinations thereof may exist or may be added.

Figure 1:
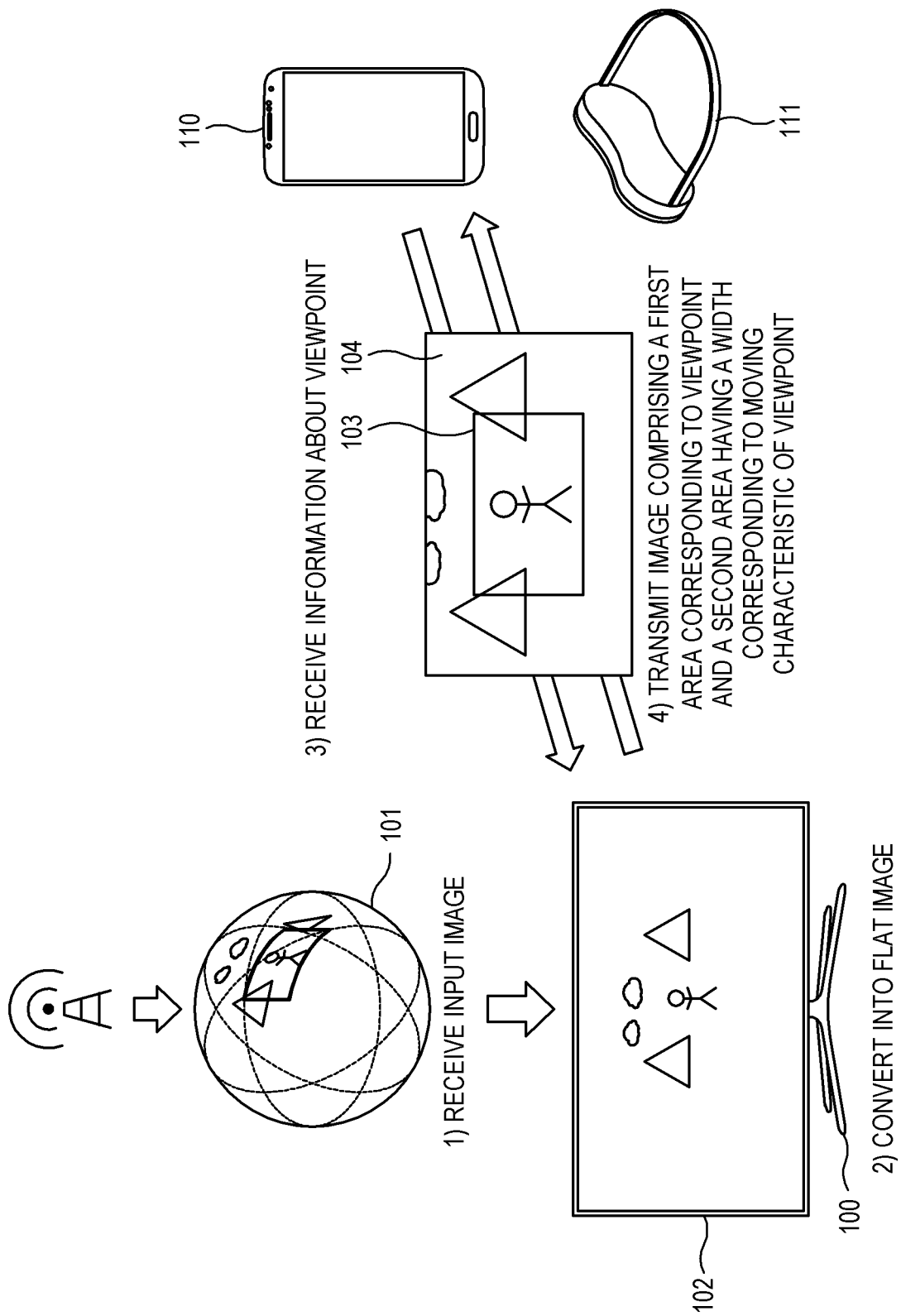
FIG. 1 illustrates schematic operations of the electronic apparatus according to an exemplary embodiment.

FIG. 1 illustrates schematic operations of the electronic apparatus 100 according to an exemplary embodiment. The electronic apparatus 100 according to an exemplary embodiment may be, for example, a television (TV), a smartphone, a tablet computer, a mobile phone, a personal computer, a multimedia player, an electronic frame, a digital billboard, a large format display (LFD), a signage, a set-top box, a smart watch, a wearable device such as a head-mounted display (HMD), a smart home appliance such as a refrigerator, etc., capable of processing and transmitting a received image. However, embodiments are not limited thereto.

In an exemplary embodiment, the electronic apparatus 100 may receive an input image 101 which refers to an image generated corresponding to an azimuthal range where a viewpoint is movable. The input image 101 may be configured in various forms such as, for example, a spherical image, an equirectangular image, a cubic image, a pyramid image, etc. The input image 101 may be generated by a plurality of images taken by a camera including at least one lens with respect to different azimuths to enable the viewpoint to move. The at least one lens may be a wide-angle lens. However, embodiments of the input image 101 are not limited thereto. In an exemplary embodiment, the input image 101 may be an image generated by a plurality of cameras. The input image 101 may be a still image or a moving image. The electronic apparatus 100 may receive the input image 101 from at least one camera, or may receive the input image 101 from a server, a universal serial bus (USB) memory, a computer, or similar external apparatuses. However, embodiments are not limited thereto, and the electronic apparatus 100 may include at least one camera. For example, the electronic apparatus 100 may receive data corresponding to the entire input image 101 at once, or may receive data corresponding to a part of the input image 101 and may additionally receive the rest of the data as necessary. The data corresponding to a part of the input image 101 may be data corresponding to a divisional area of the input image 101.

In an exemplary embodiment, the electronic apparatus 100 may receive information about viewpoints from at least one of a first display apparatus 110 or second display apparatus 111. For example, at least one of the first display apparatus 110 or second display apparatus 111 may receive an image, which corresponds to a viewpoint set by a user within the input image 101 received by the electronic apparatus 100, from the electronic apparatus 100 and may display the received image. That is, at least one of the first display apparatus 110 or second display apparatus 111 may transmit information about a viewpoint set by a user to the electronic apparatus 100, and may display an image received from the electronic apparatus 100. In an exemplary embodiment the first display apparatus 110 or second display apparatus 111 may be, for example, a smart phone, a tablet computer, a mobile phone, a multimedia player, an electronic frame, a smart watch, an HMD or similar wearable device, etc., but embodiments are not limited thereto. In an exemplary embodiment, the first display apparatus 110 or second display apparatus 111 may be any apparatus that may transmit information about a user's viewpoint, which is input by the user or sensed by the display apparatus, to the electronic apparatus 100 and configured to display an image received from the electronic apparatus 100.

In an exemplary embodiment, as shown in FIG. 1, the electronic apparatus 100 may receive the input image 101, receive information about a viewpoint from at least one of the first display apparatus 110 or second display apparatus 111, and transmit images, which respectively correspond to a first area 103 to be displayed on a screen of at least one of the first display apparatus 110 or second display apparatus 111 corresponding to the viewpoint within the input image 101 and a second area 104 adjacent to the first area 103 and with a width corresponding to a moving characteristic of the viewpoint, to at least one of the first display apparatus 110 or second display apparatus 111.

The first area 103 is an area corresponding to a viewpoint set by the user of the first display apparatus 110 or second display apparatus 111 within the input image 101, i.e., the viewpoint received by the electronic apparatus 100 from the first display apparatus 110 or second display apparatus 111. The first area 103 is an area of an image to be displayed on the screen of at least one of the first display apparatus 110 or second display apparatus 111 when it is transmitted to the first display apparatus 110 or second display apparatus 111 from the electronic apparatus 100. The first area 103 may be shaped corresponding to the shape of the first display apparatus 110 or second display apparatus 111, and may have a rectangular form, but embodiments are not limited thereto.

The second area 104 is an area that may not be displayed on the screen of the first display apparatus 110 or second display apparatus 111, when it is transmitted to the first display apparatus 110 or second display apparatus 111, but may be displayed on the screen of the first display apparatus 110 or second display apparatus 111 when the user of the first display apparatus 110 or second display apparatus 111 who views the image of the first area 103 changes the viewpoint. The second area 104 may be an area adjacent to the first area 103, and may have a predetermined width from each edge of the first area 103. For example, if the first area 103 has a rectangular shape, the second area 104 may be an area having a predetermined width with respect to each edge of the first area 103. The width from each edge of the first area 103 to the second area 104 may not be uniform. The second area 104 may be configured in any shape as long as it is adjacent to the first area 103.

The electronic apparatus 100 may be configured to convert the input image 101 to select images corresponding to the first area 103 and the second area 104 within the input image 101, and may transmit the converted images to at least one of the first display apparatus 110 or second display apparatus 111. For example, if the input image is an equirectangular image of 360°×180°, the electronic apparatus 100 may convert the equirectangular image into a rectilinear image, and may transmit images corresponding to the first area 103 and the second area 104 to at least one of the first display apparatus 110 or second display apparatus 111.

In an exemplary embodiment, the electronic apparatus 100 may further receive information about a screen size of at least one of the first display apparatus 110 or second display apparatus 111 from the first display apparatus 110 or second display apparatus 111, respectively. The received information about the screen size of the first display apparatus 110 or second display apparatus 111 may be used in determining the first area 103. For example, the first area 103 may be determined to have a size corresponding to the screen size of the first display apparatus 110 or second display apparatus 111.

A relationship between the input image 101, the first area 103, the second area 104, and the screen of the first display apparatus 110 or second display apparatus 111 according to an exemplary embodiment will be described with reference to FIG. 2.

Figure 2:
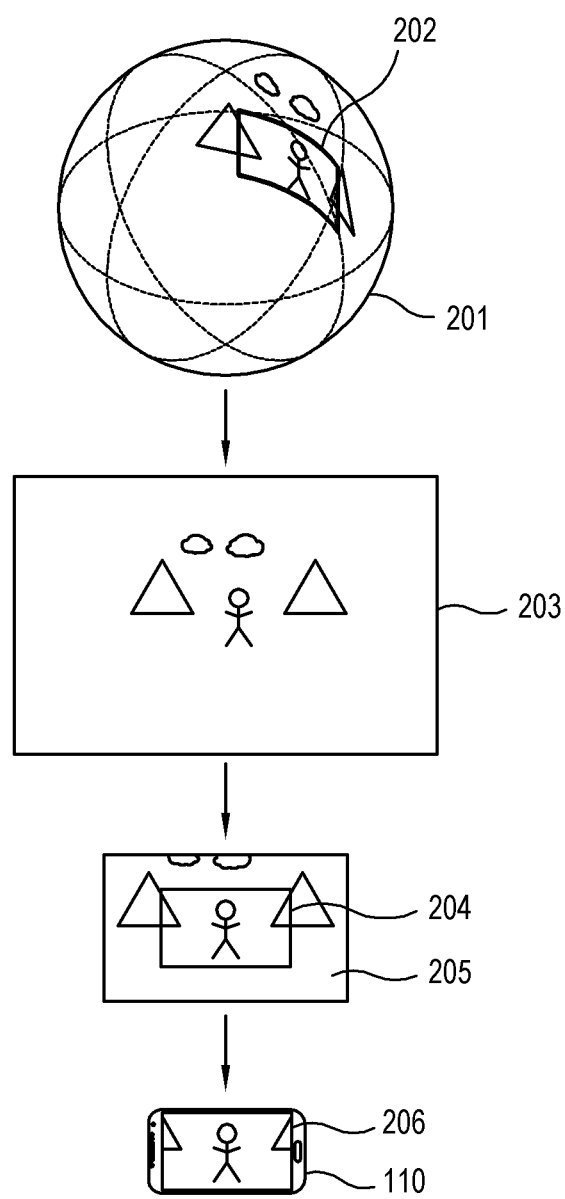
FIG. 2 illustrates an input image, a first area, a second area, and a screen of a first display apparatus according to an exemplary embodiment.

As shown in FIG. 2, the input image may be a spherical image 201. In an exemplary embodiment, the electronic apparatus 100 may receive information about a viewpoint set by the user of the first display apparatus 110 from the display apparatus 110. Referring to FIG. 2, area 202 is a part of the input image, i.e., the spherical image 201, which corresponds to a viewpoint set by the user of the first display apparatus 110. The electronic apparatus 100 may convert the input image, i.e., the spherical image 201 into a flat image 203. The area 202 of the spherical image 201 may be equivalent to the area 204 in the flat image 203. The area 204 may be a first area to be displayed on the screen of the first display apparatus 110. Further, an area adjacent to the first area 204 and having a predetermined width from each edge of the first area 204 may be a second area 205. The electronic apparatus 100 may transmit images respectively corresponding to the area 204 and the area 205 as the first area and the second area to the first display apparatus 110. The first display apparatus 110 may receive the images corresponding to the areas 204 and 205 and may display an image 206 corresponding to the area 204 on the screen. That is, the first display apparatus 110 displays the image 206 corresponding to the area 204 of the first area immediately in response to receiving the images corresponding to the areas 204 and 205 from the electronic apparatus 100. The image corresponding to the area 205 of the second area may be transmitted to but not displayed on the first display apparatus 110. The image corresponding to the area 205 as the second area may be transmitted to prepare for a change in the viewpoint by the user of the first display apparatus 110.

Figure 3:
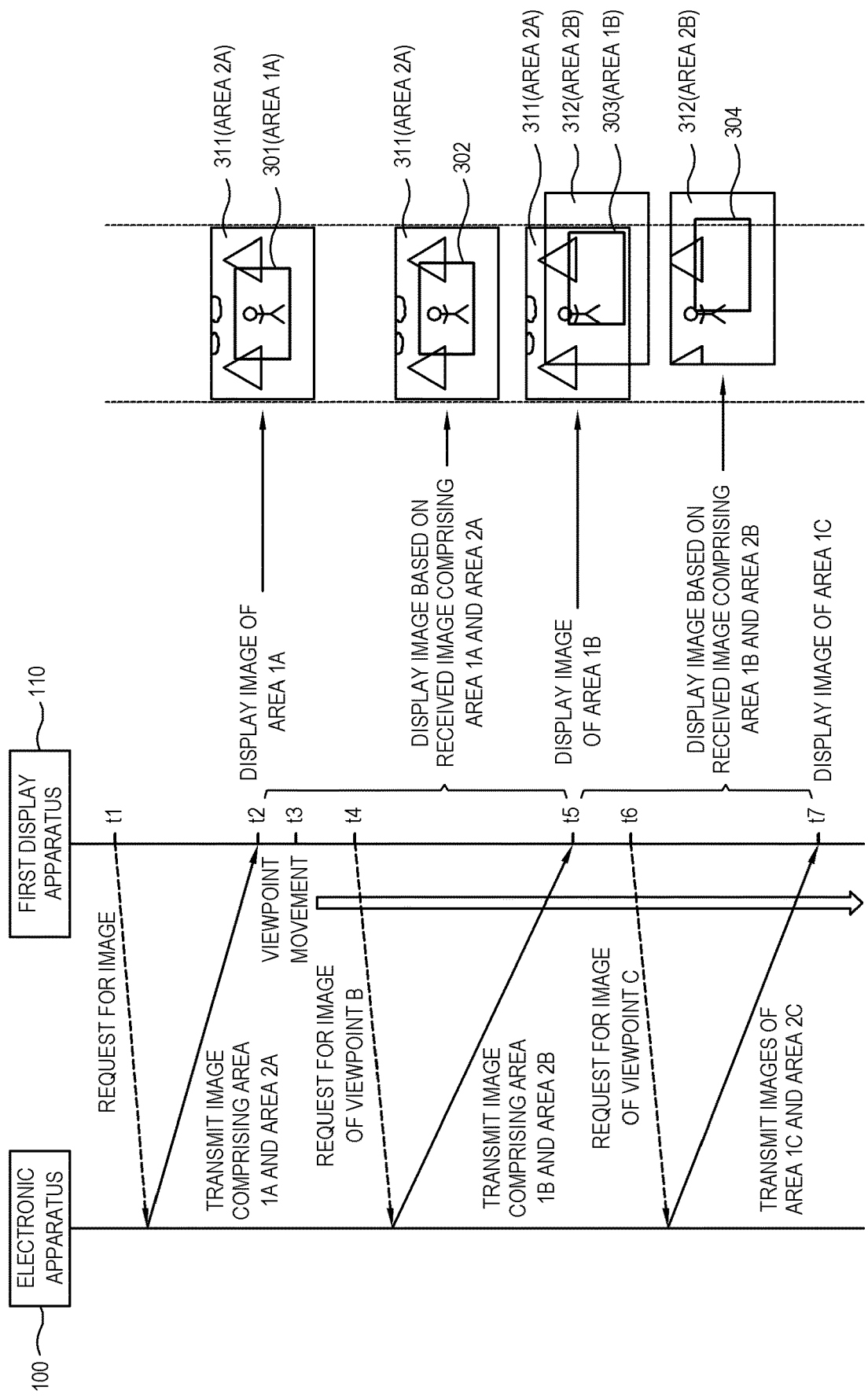
FIG. 3 illustrates communication between the electronic apparatus and the first display apparatus, and a process of displaying a screen in the first display apparatus according to an exemplary embodiment.

FIG. 3 illustrates communication between the electronic apparatus 100 and the first display apparatus 110, and processes of displaying a screen in the first display apparatus 110 according to an exemplary embodiment.

As shown in FIG. 3, the first display apparatus 110 may make a request for an image to the electronic apparatus 100 at time t1. The electronic apparatus 100 may, in response to receiving the request for the image, transmit images corresponding to an area 1A and an area 2A as the first area and the second area to the first display apparatus 110 in response to the request. The second area may be adjacent to the first area and may have a predetermined width from the edges of the first area. For example, the area 2A may be adjacent to the area 1A and have a predetermined width from the edges of the area 1A. Since delivering the images corresponding to the area 1A and the area 2A from the electronic apparatus 100 to the first display apparatus 110 may take time, the first display apparatus 110 may receive the images at time t2 after a predetermined period of time elapses from time t1. After receiving the images of the area 1A and the area 2A from the electronic apparatus 100, the first display apparatus 110 may display the image corresponding to the area 1A on the screen of the first display apparatus 110. The image corresponding to the area 2A may be transmitted but not displayed on the first display apparatus 110, until there is change in the viewpoint of a user who uses the first display apparatus 110. That is, an image 301 corresponding to the area 1A may be displayed on the screen of the first display apparatus 110, and an image 311 corresponding to the area 2A may not be displayed on the first display apparatus 110.

When the user of the first display apparatus 110 starts moving the viewpoint at time t3, at an early stage of moving the viewpoint, it may be possible to display an image 302 according to the moving viewpoint on the first display apparatus 110 based on the images received corresponding to the area 1A and the area 2A without making an additional request for an additional image to the electronic apparatus 100. However, if the viewpoint is moved for more than a predetermined period of time or by more than a predetermined amount, image data of the moved viewpoint may need to be requested.

Referring to FIG. 3, the first display apparatus 110 may make a request for an image corresponding to a viewpoint B to the electronic apparatus 100 at time t4. In response to the request, data corresponding to the request, i.e., image data of the area 1B as the first area corresponding to the viewpoint B and the area 2B as the second area adjacent to the area 1B, may be transmitted to the first display apparatus 110 at time t5. The first display apparatus 110 may display an image based on the images received corresponding to the area 1A and the area 2A from time t2 to time t5. For example, for image 302, the viewpoint may move from the image 301 initially displayed on the first display apparatus 110, but may be within the image 311 received at time t2 corresponding to the area 2A. Therefore, the image 302 may be displayed on the screen of the first display apparatus 110 without receiving the requested image corresponding to the viewpoint B at time t5. After receiving the images at time t5 corresponding to the viewpoint B, an image may be displayed based on the images (for example, images 303 and 304) newly received at time t5 corresponding to the area 1B and the area 2B. The second area may serve as a buffer for displaying an image according to the movement of a user's viewpoint prior to receiving the next image.

As described above with reference to FIG. 2 and FIG. 3, the electronic apparatus 100 according to an exemplary embodiment may transmit partial images corresponding to the first area to be displayed on at least one of the first display apparatus 110 or second display apparatus 111, and partial images corresponding to the second area adjacent to the first area to at least one of the first display apparatus 110 or second display apparatus 111 to more efficiently transmit the input image 101 to at least one of the first display apparatus 110 or second display apparatus 111. The first display apparatus 110 or second display apparatus 111 may display an image without or with reduced discontinuity irrespective of the change in the viewpoint of a user of the first display apparatus 110 or second display apparatus 111.

To enable at least one of the first display apparatus 110 or second display apparatus 111 to display an image without or with reduced discontinuity irrespective of the change in the viewpoint of the user of the first display apparatus 110 or second display apparatus 111, the image of the second area transmitted in advance to at least one of the first display apparatus 110 or second display apparatus 111 may have a variable width corresponding to the moving characteristics of the viewpoint. The moving characteristics of the viewpoint may refer to factors for determining the width of the second area, which may include various elements, causes, factors, data, grounds, etc. to be used to estimate future movement of a viewpoint of a user who uses the first display apparatus 110 or second display apparatus 111. For example, the moving characteristics of the viewpoint may include a moving speed of the viewpoint, a moving frequency of the viewpoint with respect to a specific area within an input image, a viewpoint history of a user who uses the first display apparatus 110 or second display apparatus 111, content and object information about the input image, viewpoint information of other users, etc. Further, the width of the second area may vary depending on the communication speed between the electronic apparatus 100 and the first display apparatus 110 or second display device 111. The width of the second area may increase as the communication speed becomes higher. When the communication speed is not higher than a predetermined value, transmission of data not immediately displayed on the first display apparatus 110 or second display apparatus 111 may be reduced by decreasing the width of the second area to improve a viewing experience of a user of the first display apparatus 110 or second display apparatus 111.

A relationship between the moving characteristics of the viewpoint and the second area will be described with reference to FIG. 4 to FIG. 11.

FIG. 4 illustrates a relationship between the moving speed of the viewpoint and the second area according to an exemplary embodiment. The width of the second area may increase as the moving speed of the viewpoint increases. If the moving speed of the viewpoint is relatively high, a relatively large image may need to be displayed on the first display apparatus 110 or second display apparatus 111 until the next image is transmitted to the first display apparatus 110 or second display apparatus 111. For example, if the viewpoint has a moving speed of 10°/ms, the width of 410 may be sufficient for the width of the second area. However, if the moving speed is of 20°/ms, as shown in 420, the width of the second area may need to become wider than that of 410. Further, if the moving speed is of 30°/ms, the width of the second area may need to be wider than 420, for example, as shown in 430. The moving speed of the viewpoint may be represented in °/ms with respect to a user, but embodiments are not limited thereto. For example, the moving speed of the viewpoint may be represented in another dimension such as mm/s with respect to an image.

FIG. 5 illustrates a relationship between the moving frequency of the viewpoint and the second area according to an exemplary embodiment. When a frequency of moving a viewpoint to a specific area within an input image increases, the second area may need to be wider. Since the probability of moving the viewpoint in different directions by the user of the first display apparatus 110 or second display apparatus 111 may vary, it may be more efficient to transmit an image of the second area having a wider width toward the direction with a higher probability, rather than transmit an image of the second area having a uniform width in all directions. For example, in 510, the frequencies of the viewpoint of moving toward P, Q and R may be in the order of P>Q>R, and therefore, the second area may have the largest width toward P, the next largest width toward Q and the smallest width toward R. In 520, the moving frequencies may be in the order of R>Q>P, and the width of the second area may be largest toward R, the next largest toward Q, and the smallest toward P, and in 530 the moving frequencies may be in the order of Q>P>R, and the width of the second area may be largest toward Q, the next largest toward P, and the smallest toward R.

The speed of moving the viewpoint and the frequency of moving the viewpoint with regard to a specific area may be determined based on a users' viewpoint history. FIG. 6 shows an example table of a user's viewpoint history according to an exemplary embodiment. As shown in FIG. 6, an average speed of moving a viewpoint and an average frequency of moving a viewpoint to a image X may be derived according to each of the users based on each of the user's history may be used in determining the second area surrounding the image X. In FIG. 6, the average speed of moving the viewpoint may be related to the image X, but the average speed of moving the viewpoint may be not limited to any image.

As shown in FIG. 6, the width of the second area may be further determined based on information regarding an average static time in an area and a preference content type according to the users. For example, if the average static time in the area is relatively long, the viewpoint may remain in that area for a relatively long time. Therefore, when a request for image information corresponding to the area is made, the second area having a relatively narrow width may be transmitted. When the preference content type is used for determining the second area, if content preferred by a user is displayed around a requested image, the second area with a wider width toward the preferred content may be transmitted.

The width of the second area may vary depending on the number of display apparatuses. According to an exemplary embodiment, the plurality of display apparatuses such as the first display apparatus 110 and second display apparatus 111 may receive an image from the electronic apparatus 100. FIG. 7 illustrates a plurality of display apparatuses with respect to the electronic apparatus 100 according to an exemplary embodiment.

Referring to FIG. 7, the first display apparatus 110 may transmit first viewpoint information to the electronic apparatus 100, and the second display apparatus 111 may transmit second viewpoint information to the electronic apparatus 100. For example, if the first viewpoint information and the second viewpoint information include the average viewpoint moving speeds of each of the users who respectively use the first and second display apparatuses 110 and 111, in addition to information about the viewpoints of the input image respectively set by the users of the first and second display apparatuses 110 and 111, or if the electronic apparatus 100 receives the users' average viewpoint moving speeds from the first and second display apparatuses 110 and 111, the electronic apparatus 100 may adjust an area 2A and an area 2B to have a width corresponding to results of comparison between the moving speed of the first viewpoint and the moving speed of the second viewpoint, and may transmit an image 704 of the area 2A and an image 706 of the area 2B to the first display apparatus 110 and the second display apparatus 111, respectively. Thus, the viewpoint moving speeds according to the plurality of users may be reflected in transmitting images, thereby reducing discontinuity in displaying an image on the first display apparatus 110 and the second display apparatus 111.

Further, the second area may have a width determined within a range of a communication bandwidth between the electronic apparatus 100 and each of the first display apparatus 110 and second display apparatus 111. Thus, an image may be transmitted from the electronic apparatus 100 to at least one of the first display apparatus 110 or second display apparatus 111 within the range of the communication bandwidth.

Further, the width of the second area may vary depending on network conditions between the electronic apparatus 100 and the first display apparatus 110 or second display apparatus 111. For example, if a network speed is not above a predetermined value between the electronic apparatus 100 and the first display apparatus 110 or second display apparatus 111, the second area with narrower widths may be transmitted to reduce the amount of data being transmitted. When the network speed is above the predetermined value, the width of the second area may be widened to display an image when the viewpoint moving speed of the user is increased.

Figure 8:
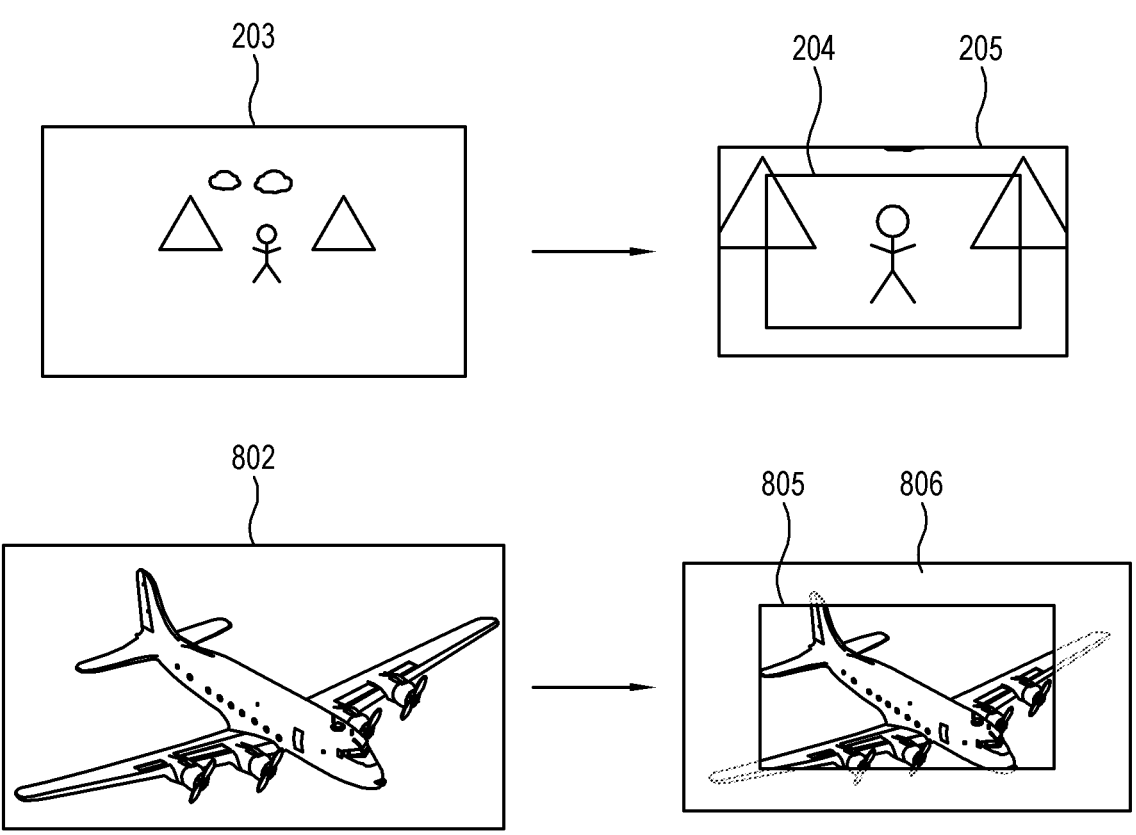
FIG. 8 shows an example of determining a moving characteristic of a viewpoint based on content of an input image according to an exemplary embodiment.

The moving characteristic of the viewpoint and the width of the corresponding second area may be determined based on one or more contents of an input image 101 as illustrated in FIG. 8. There are no limits to contents of an input image 101 to be transmitted to the electronic apparatus 100 according to an exemplary embodiment. For example, the input image 101 may include an image 801 containing a static image such as nature and scenery, and an image 802 containing a dynamic image such as a moving airplane or vehicle. The width of the second area may be widened for the image 802 containing the dynamic image compared to the image 801 containing the static image. That is, the width of the second area 806 of the image 802 may being wider than the width of the second area 804 of the image 801.

Figure 9:
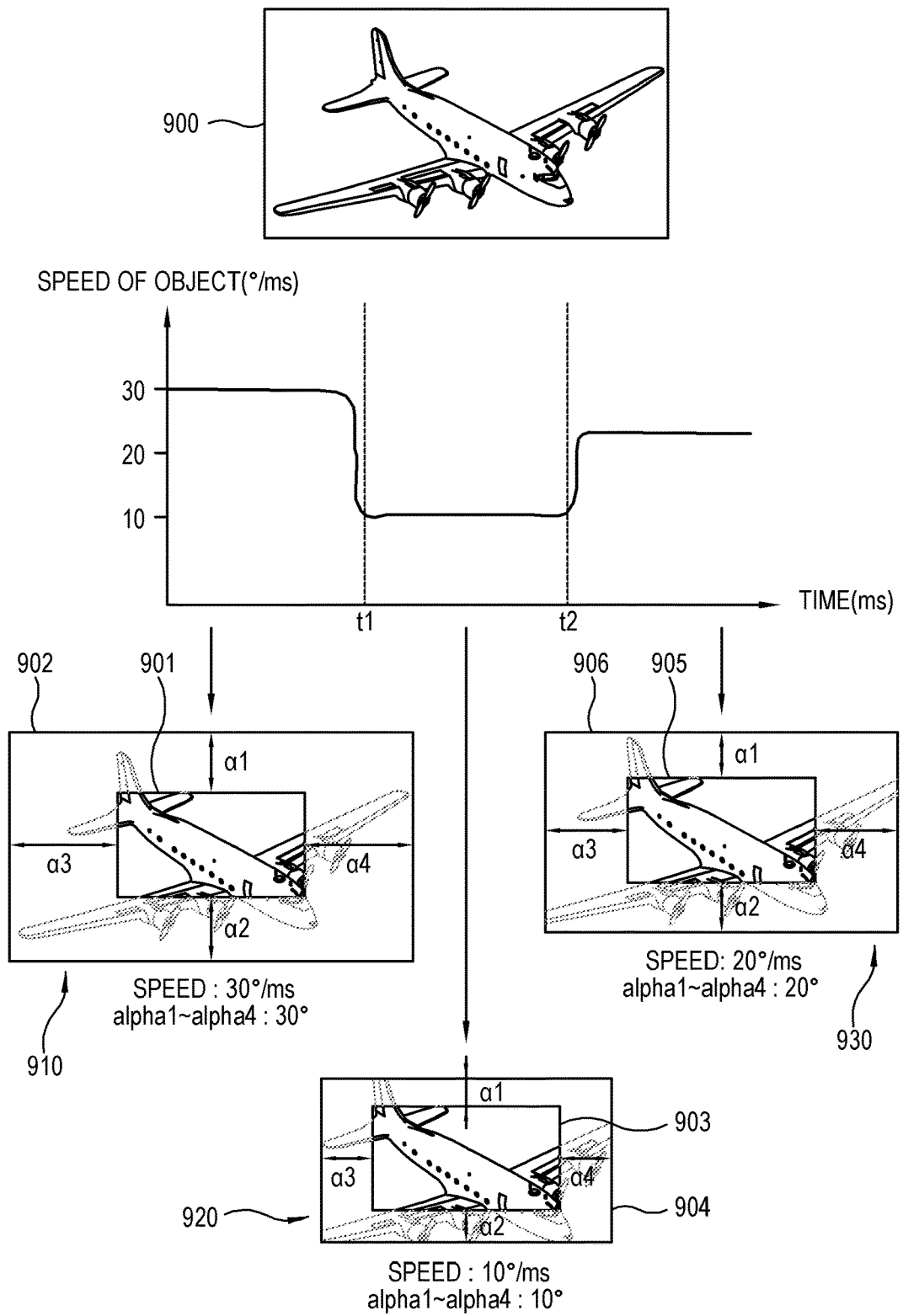
FIG. 9 shows an example of determining the moving characteristic of the viewpoint based on content of the input image according to an exemplary embodiment.

The content of the input image 101 may include information about an object within the input image 101, for example, a speed of an object obtained by tracking a moving object, in addition to the types of objects within the input image 101. Further, the moving characteristic of the viewpoint and the width of the corresponding second area may be determined based on the speed of an object, as illustrated in FIG. 9. Referring to FIG. 9, an input image 900 may include a moving image of an airplane flying in the sky. As shown in the graph of FIG. 9, if an airplane in an input image 900 has a speed of 30°/ms from a start time of reproducing the moving image to time t1, a speed of 10°/ms from time t1 to time t2, and a speed of 20°/ms after time t2, the electronic apparatus 100 may determine the width of the second area based on the speed of the airplane according to each corresponding time frame. That is, if the second area has widths of α1, α2, α3 and α4, respectively, corresponding to the upward, downward, leftward, and rightward directions, images may be transmitted to the first display apparatus 110 or second display apparatus 111 by setting the widths α1~α4 corresponding to the speed of 30°/ms as shown in 910, the widths α1~α4 corresponding to the speed of 10°/ms as shown in 920, and the widths α1~α4 corresponding to the speed of 20°/ms as shown in 930. The widths α1~α4 may be in the order of 910>930>920.

Figure 10:
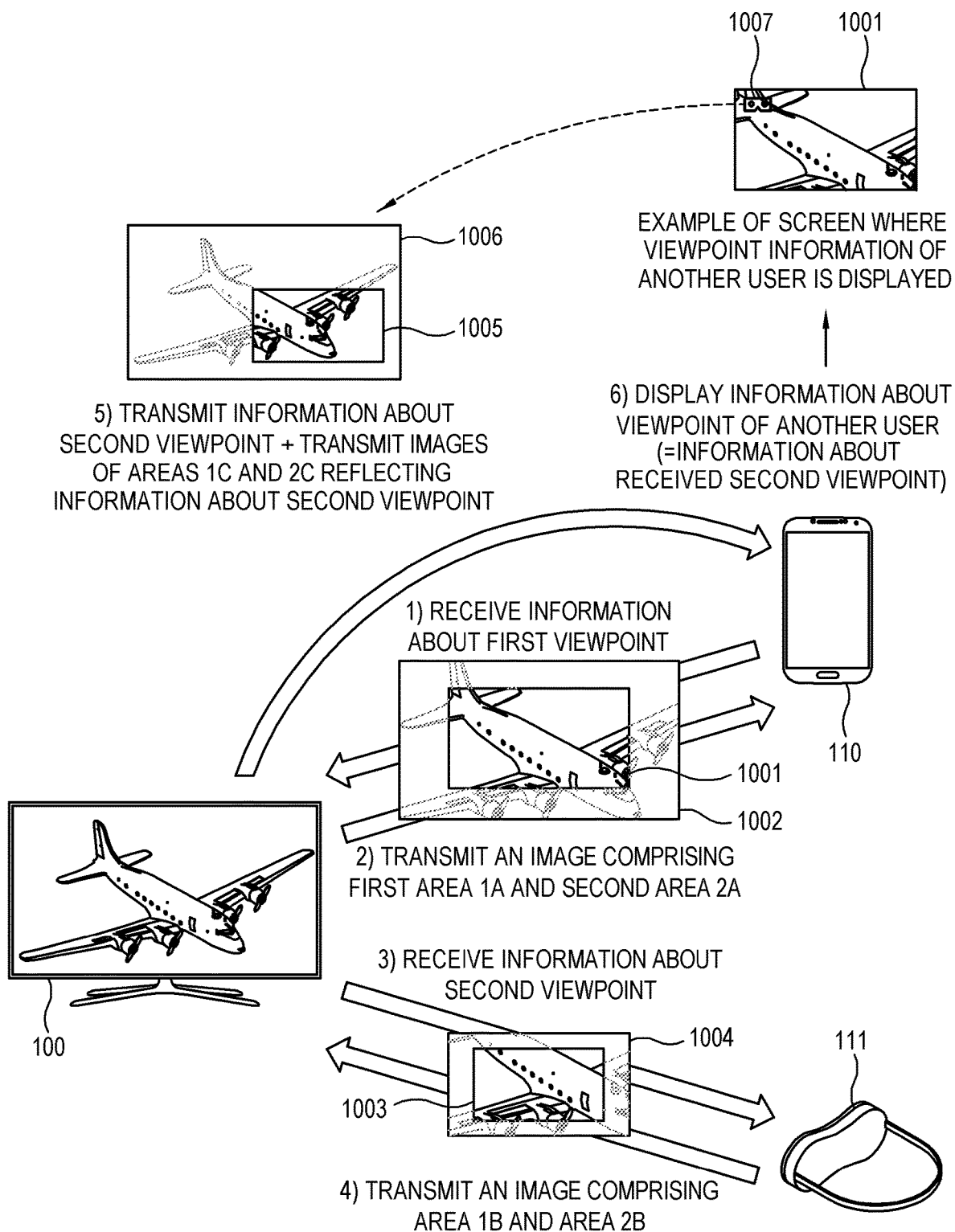
FIG. 10 shows an example of using the viewpoint information of another user with respect to an image in the electronic apparatus according to an exemplary embodiment.

The moving characteristic of the viewpoint and the width of the second area may be determined based on the viewpoint information of other users. FIG. 10 shows an example of using the current viewpoint information of another user with respect to an image in the electronic apparatus 100 according to an exemplary embodiment. A user of the first display apparatus 110 and a user of the second display apparatus 111 may be viewing the same input image at the same time. However, users' viewpoints may be different within the input image 101. For example, the user of the first display apparatus 110 may transmit information about a first viewpoint to the electronic apparatus 100 and display an image 1001 corresponding to an area 1A received corresponding to the first viewpoint from the electronic apparatus 100, and the user of the second display apparatus 111 may transmit information about a second viewpoint to the electronic apparatus 100 and display an image 1003 corresponding to an area 1B received corresponding to the second viewpoint from the electronic apparatus 100. At this time, information about a viewpoint of a user may be displayed on a screen being viewed by another user. For example, a position of a viewpoint being currently viewed by the user of the second display apparatus 111 may be displayed as an icon 1007 on an image 1001 being viewed by the user of the first display apparatus 110. Thus, the user of the first display apparatus 110 may be aware of the viewpoint being currently viewed by the user of the second display apparatus 111. The user of the first display apparatus 110 may move his/her viewpoint toward the viewpoint of the second user. To reflect such user's movement in transmitting an image, i.e., an image of the second area from the electronic apparatus 100 to the first display apparatus 110, the width in a direction toward another user's viewpoint may be increased in determining the second area to be transmitted as shown in 1006.

Figure 11:
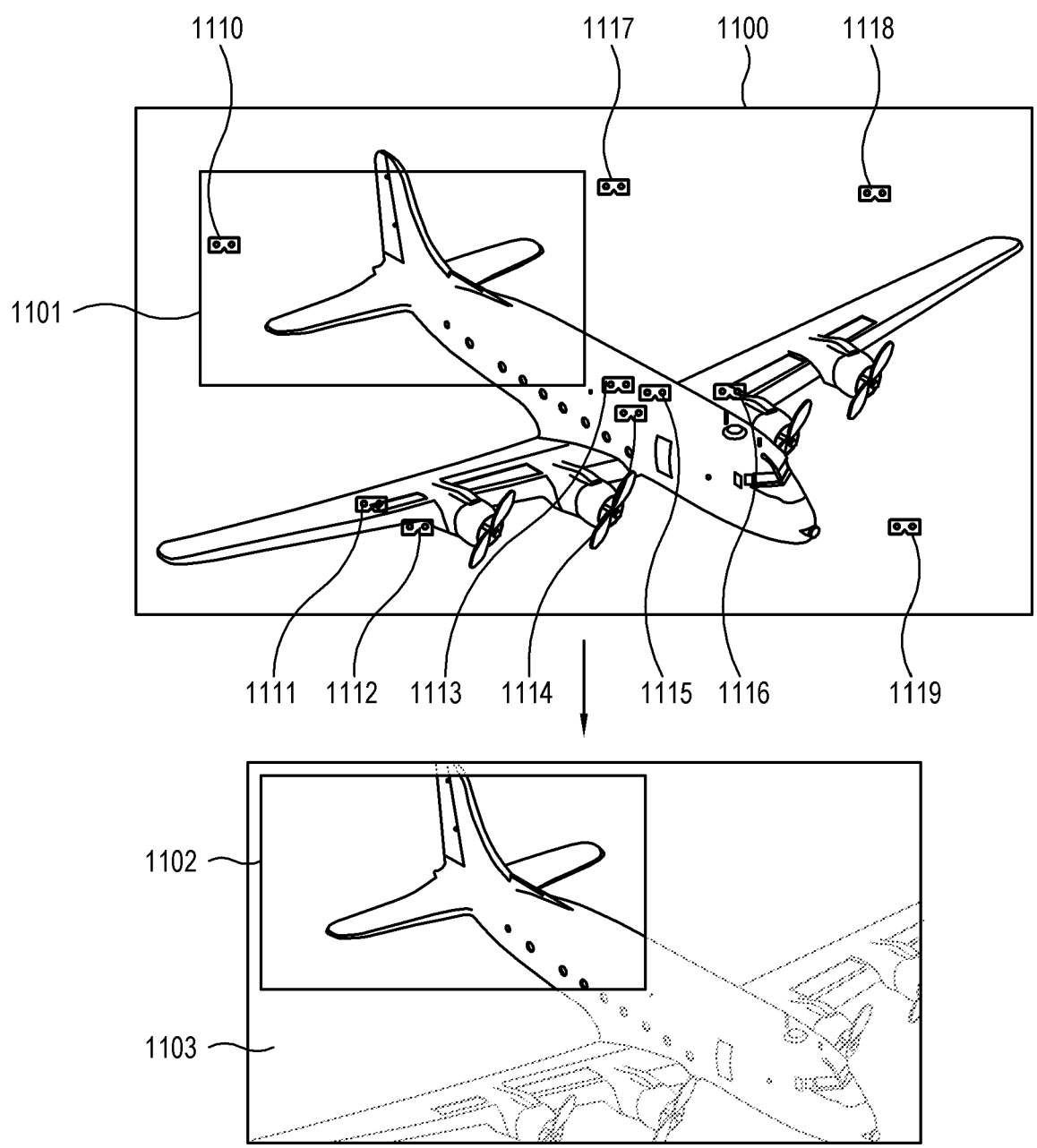
FIG. 11 shows an example of determining a viewpoint moving characteristic and a width of the second area based on viewpoint histories of a plurality of users with respect to an image in the electronic apparatus according to an exemplary embodiment.

According to an exemplary embodiment, the second area may be determined based on another user's viewpoint information, where viewpoint histories respectively corresponding to a plurality of other users may be used with respect to an image. That is, movement of a current user's viewpoint is estimated based on preference viewpoint information of a plurality of other users. FIG. 11 shows the electronic apparatus 100 according to an exemplary embodiment determining the viewpoint moving characteristics and the width of the second area based on viewpoint histories of a plurality of other users with respect to an image.

The electronic apparatus 100 may collect view histories, in particular, viewpoint movement histories of a plurality of users with respect to an input image 101, and may show the viewpoint movement histories to a user of the first display apparatus 110 or second display apparatus 111. For example, referring to FIG. 11, the electronic apparatus 100 may collect and analyze the viewpoint movement histories of a plurality of users with respect to the input image 1100, and determine preference points 1110-1118 where the viewpoints of a plurality of users remain in common for more than a predetermined period of time. When the user of the first display apparatus 110 sends viewpoint information of an area 1101 to make a request for an image of the area 1101, the electronic apparatus 100 may determine the first area as the area 1101 and may transmit the corresponding image 1102. Here, the width of the second area may be determined based on the preference points.

Referring to FIG. 11, there may be five preference points 1113-1117 in the rightward direction of the area 1101, and two preference points 1111 and 1112 in the downward direction of the area 1101, but there may be one preference point 1110, 1117 in each of the leftward and upward directions of the area 1101. In this regard, the second area may have relatively wide widths in the rightward and downward directions, but relatively narrow widths in the leftward and upward directions as shown in 1103.

Figure 12:
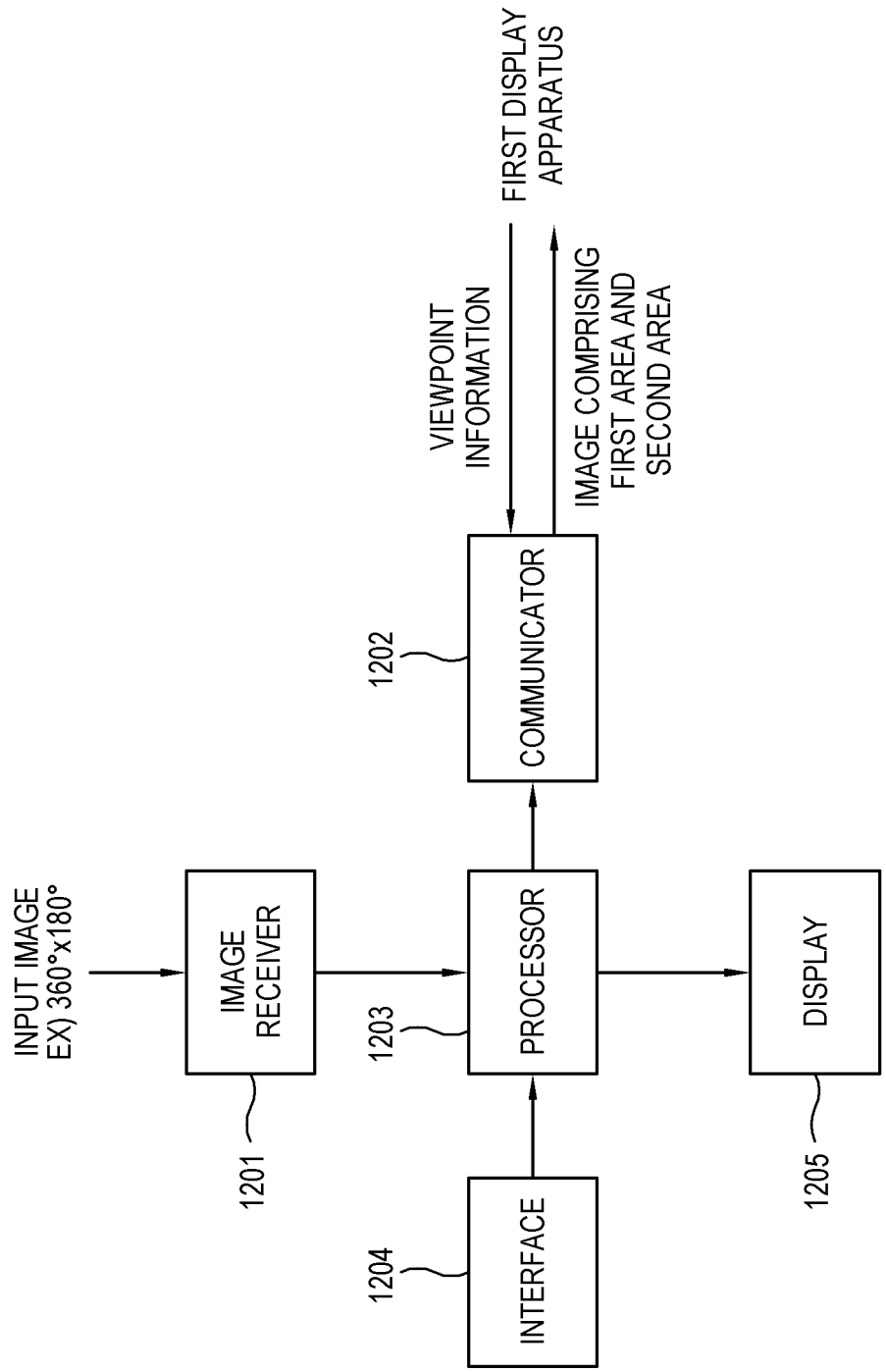
FIG. 12 is a block diagram of the electronic apparatus according to an exemplary embodiment.

FIG. 12 is a block diagram of the electronic apparatus 100 according to an exemplary embodiment. The electronic apparatus 100 according to an exemplary embodiment may include an image receiver 1201, a communicator 1202, and a processor 1203. The electronic apparatus 100 may further include an interface 1204 and a display 1205. However, embodiments are not limited thereto. For example, the electronic apparatus 100 according to an exemplary embodiment may include one or more elements in addition to those shown in FIG. 12, or exclude at least one of the elements from those shown in FIG. 12. In exemplary embodiments, an element in FIG. 12 may perform at least one function or operation, be materialized by hardware, software or combination of hardware and software, be realized in the form of a circuit or chip, and include at least one processor.

The image receiver 1201 may receive an image signal including an input image 101. The image receiver 1201 may include a tuner configured to receive an image signal. The tuner may be tuned to a certain channel selected by a user among a plurality of channels to receive a broadcasting signal. The image receiver 1201 may receive an image signal from an image processing device such as a set-top box, a digital versatile disc (DVD) player, a personal computer (PC), etc., a mobile device such as a smart phone, etc., or a server through the Internet.

The communicator 1202 may communicate with at least one of the first display apparatus 110 or second display apparatus 111. The communicator 1202 may receive viewpoint information from at least one of the first display apparatus 110 or second display apparatus 111, and may transmit the images corresponding to the first area and the second area to at least one of the first display apparatus 110 or second display apparatus 111. The communicator 1202 may be configured in various forms according to the types of the display apparatus or the electronic apparatus 100. For example, the communicator 1202 may include a connection unit for wired communication, and the connection unit may receive/transmit a signal/data based on a high definition multimedia interface (HDMI), HDMI-consumer electronics control (CEC), a universal serial bus (USB), component, and the like standards, and may include at least one connector or terminal corresponding to the standards. The communicator 1202 may perform wired communication with a plurality of servers through a wired local area network (LAN). The communicator 1202 may be configured to communicate by various communication methods as well as the connector or the terminal for the wired connection. For example, the communicator 1201 may include a radio frequency (RF) circuit for transmitting and receiving an RF signal to perform wireless communication with one or more external apparatuses, and implement one or more among wireless fidelity (Wi-Fi), Bluetooth, Zigbee, ultra-wide band (UWB), wireless USB, and near field communication (NFC).

The processor 1203 may be configured to control elements of the electronic apparatus 100, and may execute various processes such as signal processing to the input image 101. An element for performing the control may be provided inside the processor 1203, or may be provided separately from the processor 1203. The processor 1203 may include a program for implementing control and processing operations, a nonvolatile memory in which the program is installed, a volatile memory in which the installed program is at least partially loaded, and at least one microprocessor or central processing unit (CPU) for executing the loaded program. The program may include a program(s) given in the form of at least one a basic input/output system (BIOS), a device driver, an operating system (OS), a firmware, a platform, and an application program. According to an exemplary embodiment, the application program may be previously installed or stored in the electronic apparatus 100 when the electronic apparatus 100 is manufactured, or may be installed in the electronic apparatus 100 based on data of the application program received from the outside when it is used. The data of the application program may be, for example, downloaded from an external server such as an application market into the electronic apparatus 100. The foregoing program may be entirely or partially stored in a computer-readable medium including the processor. The medium may include all types of computer-readable recording media. The following method according to an exemplary embodiment to be described with reference to FIG. 13 may be achieved by a computer program.

According to an exemplary embodiment, the processor 1203 may be configured to control the image receiver 1201 to receive the input image 101. Further, the processor 1203 may control the communicator 1202 to receive information about the first viewpoint from at least one of the first display apparatus 110 and to send at least one of the first display apparatus 110 the images of the first area to be displayed corresponding to the first viewpoint on the screen of the first display apparatus 110 and the second area adjacent to the first area and having the width corresponding to the moving characteristic of the first viewpoint.

The interface 1204 may receive a user's input and transmit to the processor 1203. The interface 1204 may be, for example, a menu button installed on an outer side of the electronic apparatus 100, a remote controller signal receiver and configured to receive a remote control signal corresponding to a user input from the remote controller, a touch screen provided in the electronic apparatus 100 and configured to receive a user's touch input, a camera configured to receive a user's gesture input, a microphone configured to receive a user's voice input, a sensor configured to sense a user's motion, etc.

The display 1205 may output the input image 101. The display 1205 may include, for example, liquid crystal, plasma, a light-emitting diode (LED), an organic light-emitting diode (OLED), a surface-conduction electron-emitter, a carbon nano-tube, a nano-crystal, and the like various display types. In case of the liquid crystal type display, the display 1205 may include a liquid crystal display (LCD) panel, a backlight unit for emitting light to the LCD panel, a panel driving substrate for driving the LCD panel, etc. The display 1205 may include an OLED panel without the backlight unit.

Figure 13:
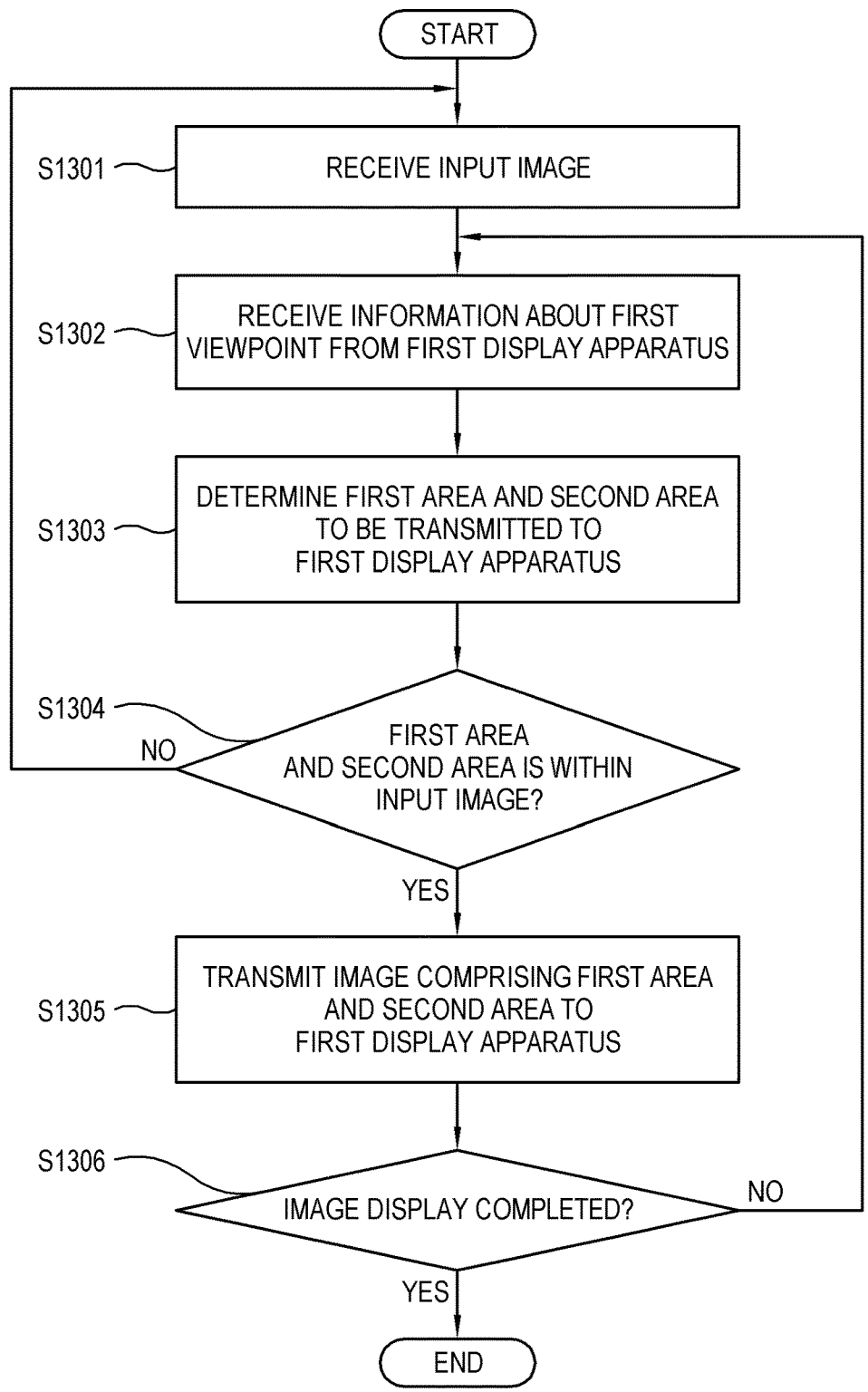
FIG. 13 is a flowchart of controlling the electronic apparatus according to an exemplary embodiment.

FIG. 13 is a flowchart illustrating controlling the electronic apparatus 100 according to an exemplary embodiment. The electronic apparatus 100 receives an input image 101 generated corresponding to an azimuthal range where a viewpoint is movable (S1301). Further, information about a first viewpoint is received from a first display apparatus 110 (S1302). Then, a first area to be displayed on a screen of a first display apparatus 110 corresponding to the received information about the first viewpoint and a second area adjacent to the first area and having a width corresponding to a moving characteristic of the first viewpoint are determined within the input image (S1303). The electronic apparatus 100 preferentially receives only some data of the input image 101, and receives the rest data of the input image 101 as necessary. The received data of the input image 101 may not include data of the images corresponding to the first and second areas to be transmitted to the first display apparatus 110. Therefore, the electronic apparatus 100 may determine whether the data of the input image 101 is received corresponding to the first area and the second area (S1304). If the data corresponding to the first and second areas is not received, the data of the input image 101 may be additionally received by returning to the operation S1301. In this case, the operation S1302 of receiving the information about the first viewpoint or the operation S1303 of determining the first area and the second area after the operation S1301 of receiving the input image 101 may be omitted. If the data of the input image 101 has been already received corresponding to the first area and the second area, the electronic apparatus 100 transmits the images corresponding to the first area and the second area to the first display apparatus 110 (S1305). Then, it is determined whether the image is completely reproduced (S1306). If the image is not completely reproduced, information of the first viewpoint may be received by returning to the operation S1302.

According to an exemplary embodiment, an image generated corresponding to the azimuthal range may be more efficiently transmitted to a display apparatus configured to display the image.

Further, according to an exemplary embodiment, an efficiency of transmitting an image may be increased, and thus, an image may be transmitted to and displayed on a display apparatus without or with reduced discontinuity when a user of the display apparatus changes a viewpoint.

Exemplary embodiments have been shown and described, however, exemplary embodiments are not limited thereto. It will be appreciated by those skilled in the art that changes may be made in these exemplary embodiments without departing from the principles and spirit of the present disclosure, the scope of which is defined in the appended claims and their equivalent.

What is claimed is:

1. An electronic apparatus comprising:
an image receiving tuner configured to receive an input image corresponding to an azimuthal range where a viewpoint is movable;
a communication transceiver configured to communicate with a first display apparatus; and
at least one processor configured to:
control the communication transceiver to receive information of a first viewpoint from the first display apparatus, and
control the communication transceiver to transmit an image comprising a first area and a second area within the input image to the first display apparatus, the first area corresponding to the first viewpoint and being displayed on a screen of the first display apparatus, and the second area being adjacent to the first area and comprising one or more widths corresponding to a moving characteristic of the first viewpoint, and
control the communication transceiver to receive information of a second viewpoint from a second display apparatus configured to display an image corresponding to the second viewpoint within the input image that is different from the first viewpoint,
wherein the processor is further configured to determine the one or more widths of the second area based on a comparison between a moving speed of the first viewpoint and a moving speed of the second viewpoint.

2. The electronic apparatus according to claim 1, wherein the processor is further configured to control the communication transceiver to receive information of a screen size of the first display apparatus from the first display apparatus, and
wherein the first area corresponds to the screen size of the first display apparatus.

3. The electronic apparatus according to claim 2, wherein the processor is further configured to
determine the one or more widths of the second area based on a speed of one or more contents included in the first area of the input image.

4. The electronic apparatus according to claim 3, wherein the processor is further configured to determine the one or more widths of the second area within a range of a communication bandwidth between the electronic apparatus and the first and second display apparatuses.

5. The electronic apparatus according to claim 1, wherein the moving characteristic of the first viewpoint comprises the moving speed of the first viewpoint and a moving frequency of the first viewpoint with respect to a certain area within the input image.

6. The electronic apparatus according to claim 1, wherein the processor is further configured to determine the moving characteristic of the first viewpoint based on a viewpoint history of a user of the first display apparatus.

7. The electronic apparatus according to claim 1, wherein the processor is further configured to:
transmit the information of the second viewpoint to the first display apparatus.

8. The electronic apparatus according to claim 7, wherein the processor is further configured to determine the moving characteristic of the first viewpoint based on the second viewpoint.

9. The electronic apparatus according to claim 1, wherein the processor is further configured to determine the one or more widths of the second area based on network conditions between the electronic apparatus and the first display apparatus.

10. A control method of an electronic apparatus, the control method comprising:
receiving an input image corresponding to an azimuthal range where a viewpoint is movable;
receiving information of a first viewpoint from a first display apparatus;
transmitting an image comprising a first area and a second area within the input image to the first display apparatus, the first area corresponding to the first viewpoint and being displayed on a screen of the first display apparatus, the second area being adjacent to the first area and comprising one or more widths corresponding to a moving characteristic of the first viewpoint;
receiving information of a second viewpoint from a second display apparatus configured to display an image corresponding to the second viewpoint within the input image that is different from the first viewpoint;
transmitting the information of the second viewpoint to the first display apparatus; and
determining the one or more widths of the second area based on a comparison between a moving speed of the first viewpoint and a moving speed of the second viewpoint.

11. The control method according to claim 10, further comprising receiving information of a screen size of the first display apparatus from the first display apparatus,
wherein the first area corresponds to the screen size of the first display apparatus.

12. The control method according to claim 10, wherein the moving characteristic of the first viewpoint comprises tithe moving speed of the first viewpoint and a moving frequency of the first viewpoint with respect to a certain area within the input image.

13. The control method according to claim 10, further comprising determining the moving characteristic of the first viewpoint based on a viewpoint history of a user of the first display apparatus,
wherein the viewpoint history of the user comprises at least one of an average moving speed of the first viewpoint, a moving frequency of the first viewpoint, and one or more contents in the input image.

14. The control method according to claim 10, further comprising determining the one or more widths of the second area based on a speed of one or more contents included in the first area of the input image.

15. The control method according to claim 10, further comprising determining the one or more widths of the second area based on network conditions between the electronic apparatus and the first display apparatus.

16. A computer program product comprising a non-transitory computer readable storage medium having a computer program stored thereon, which, when executed by a computing device, causes the computing device to execute the control method according to claim 10.

17. The computer program product of claim 16, wherein the computer program is stored in the non-transitory computer readable storage medium in a server, and
wherein the computer program is downloaded over a network to the computing device.

* * * * *